(12) United States Patent
Xu et al.

(10) Patent No.: US 11,973,994 B2
(45) Date of Patent: Apr. 30, 2024

(54) MEDIA PROCESSING METHOD

(71) Applicant: Shanghai Jiao Tong University, Shanghai (CN)

(72) Inventors: Yiling Xu, Shanghai (CN); Qi Yang, Shanghai (CN); Yunfeng Guan, Shanghai (CN)

(73) Assignee: Shanghai JiaoTong University, Shanghai (CN)

( * ) Notice: Subject to any disclaimer, the term of this patent is extended or adjusted under 35 U.S.C. 154(b) by 0 days.

(21) Appl. No.: 17/597,427

(22) PCT Filed: Jul. 4, 2020

(86) PCT No.: PCT/CN2020/100297
§ 371 (c)(1),
(2) Date: Jan. 5, 2022

(87) PCT Pub. No.: WO2021/004411
PCT Pub. Date: Jan. 14, 2021

(65) Prior Publication Data
US 2022/0272391 A1 Aug. 25, 2022

(30) Foreign Application Priority Data

Jul. 5, 2019 (CN) .......................... 201910604344.6
Sep. 12, 2019 (CN) .......................... 201910862257.0

(51) Int. Cl.
*H04N 21/235* (2011.01)
(52) U.S. Cl.
CPC .............................. *H04N 21/2353* (2013.01)
(58) Field of Classification Search
CPC ................................................ H04N 21/2353
See application file for complete search history.

(56) References Cited

U.S. PATENT DOCUMENTS 8,917,744 B2 * 12/2014 Childress .............. G06F 9/5011
709/225
9,076,311 B2 * 7/2015 Rachamadugu ..... G11B 27/107
(Continued)

FOREIGN PATENT DOCUMENTS

CN 101339789 A 1/2009
CN 101779398 A 7/2010
(Continued)

OTHER PUBLICATIONS

Xu et al., A Cost-Efficient Cloud Gaming System at Scale, IEEE Network, Jan./Feb. 2018, 42-47, vol. 32 Issue 1, IEEE.
(Continued)

*Primary Examiner* — Randy A Flynn
(74) *Attorney, Agent, or Firm* — ArentFox Schiff LLP

(57) ABSTRACT

Provided is a media processing method. The method is used for uploading a function provided by a user or a third party and obtaining media processing parameters provided by the user. The method includes the following steps: receiving the description information of the media processing and determining whether a function that fulfills the requirement of the description information exists in a system; in a case where the function that fulfills the requirement of the description information exists, selecting the function that fulfills the requirement of the description information from the system; and in a case where the function that fulfills the requirement of the description information does not exist, selecting the function from the system according to the priority or selecting the function that fulfills the requirement of the description information from outside the system.

8 Claims, 1 Drawing Sheet

(56) References Cited

U.S. PATENT DOCUMENTS

| | | | |
|---|---|---|---|
| 9,407,944 B1* | 8/2016 | Galdy | H04N 21/2402 |
| 2005/0007953 A1 | 1/2005 | Hirose et al. | |
| 2008/0178030 A1 | 7/2008 | Koizumi | |
| 2011/0145392 A1* | 6/2011 | Dawson | H04L 47/783 709/224 |
| 2011/0161497 A1 | 6/2011 | Childress et al. | |
| 2012/0323986 A1* | 12/2012 | Sayko | H04L 47/10 709/201 |
| 2014/0244804 A1* | 8/2014 | Ying | H04L 65/762 709/219 |
| 2017/0093988 A1* | 3/2017 | Rehaag | G06Q 10/00 |
| 2018/0130182 A1 | 5/2018 | Bhatt et al. | |

FOREIGN PATENT DOCUMENTS

| | | | |
|---|---|---|---|
| CN | 102123269 | A | 7/2011 |
| CN | 103731672 | A | 4/2014 |
| CN | 106169065 | A | 11/2016 |
| CN | 106295489 | A | 1/2017 |
| CN | 106358042 | A | 1/2017 |
| CN | 109213991 | A | 1/2019 |
| CN | 109831636 | A | 5/2019 |
| JP | 2010166339 | A | 7/2010 |
| WO | 2011087138 | A1 | 7/2011 |

OTHER PUBLICATIONS

First Search Report of CN Patent Application No. 2019108622570.

International Search Report for PCT/CN2020/100297, dated Sep. 21, 2020.

Office Action of Chinese Patent Application No. 201910862257.0, dated Apr. 23, 2021.

Office Action of Chinese Patent Application No. 201910862257.0, dated Sep. 7, 2021.

Office Action of Chinese Patent Application No. 201910862257.0, dated Dec. 24, 2021.

Supplementary Search of Chinese Patent Application No. 201910862257.0.

Editor's Updates NBMP; ISO 23090-8:2018(E); ISO/IEC JTC1/SC 29/WG 11; Information technology—Coded representation of immersive media—Part 8: Network Based Media Processing; Draft of CD stage; 2018. URL: https://mpeg.chiariglione.org/standards/mpeg-i/network-based-media-processing/text-isoiec-cd-23090-8-network-based-media. XP055741285.

Extended European Search Report dated Jun. 26, 2023 from corresponding European Application No. 20837305.0.

Jaehyeon Bae: "[NBMP] Editor's Update to 1-10 NBMP WD", 125. MPEG Meeting; Jan. 14, 2019-Jan. 18, 2019; Marrakech; (Motion Picture Expert Group or ISO/IEC JTC1/SC29/WG11), No. m46019, Jan. 14, 2019 (Jan. 14, 2019), XP030214471, Retrieved from the Internet: URL:http://phenix.int-evry.fr/mpeg/doc_end_user/documents/125_Marrakech/wgll/m46019-v3-m46019_Editor_Update_NBMP_WD_r3.zipm46019_Editor_Update_NBMP_WD_r2.docx [retrieved on Jan. 14, 2019]. XP030214471.

Office Action dated Jan. 31, 2023 from corresponding Japanese Application No. 2022-500152.

Office action dated Nov. 13, 2023 from corresponding KR Application No. 0-2021-7042745.

The AWS Lambda Serverless Project 2—IAM, Lambda, Elastic Transcoder, NPM, S3, CloudWatch, and the Kim JeongChul teeth spool of thread (Apr. 21, 2018).

* cited by examiner

MEDIA PROCESSING METHOD

CROSS-REFERENCES TO RELATED APPLICATIONS

This application is a national stage application filed under 35 U.S.C. 371 based on International Patent Application No. PCT/CN2020/100297, filed on Jul. 4, 2020, which claims priority to Chinese Patent Application No. 201910604344.6 filed with the CNIPA on Jul. 5, 2019 and Chinese Patent Application No. 201910862257.0 filed with the CNIPA on Sep. 12, 2019, disclosures of which are incorporated herein by reference in their entireties.

TECHNICAL FIELD

The present disclosure relates to the field of cloud processing systems and, in particular, to a media processing method.

BACKGROUND

With the rapid development of visual media, virtual reality (VR) and point cloud (PC) are applied to more and more consumption scenarios, such as games, game lives, and medical treatment. In these scenarios, low response delay is often required, and higher requirements for processing delay and transmission delay of the data are put forward. Using a 360-degree video as an example, the server needs to collect multi-channel camera streams and then stitch and render multi-channel videos into spherical data for a user to consume. Stitching is a complex process and often produces a certain delay when the capacity of the local processor is limited. In a live scenario, this delay has a certain impact on user experience. Point cloud data is generated directly by scanning or computer, a simple point cloud object has tens of thousands or even hundreds of thousands of points, it is time-consuming to compress the geometric information and the attribute information of these points and thus, it is difficult to fulfill the real-time requirement. To solve the preceding problems, the current solution is to put the complex media processing process into the cloud and use the powerful processing capability of the cloud server to accelerate the data processing speed. The moving picture experts group (MPEG) has established a network based media processing (NBMP) working group for media cloud processing to conduct standardization study on a series of mechanisms of the media cloud processing. At present, the research on immersive media processing develops extremely rapidly, and the method represented by deep learning shows good performance. Through the training and learning network, the efficiency of media processing can be improved. Using point-cloud compression as an example, Nanjing University proposes to use a variational autoencoder (VAE) based on a three-dimensional convolutional neural network (3D CNN) for geometric compression of the point cloud, achieving good compression performance.

In reality, the user or other third party may form their own solutions for media processing and provide media processing method or media processing function. These solutions can guide the server in a cloud system to perform the media processing. However, the current cloud system does not have a mechanism or an interface that allows the user to upload the media processing method or the media processing function. How to make the cloud system adopt the solutions formed by the user or the third party is a difficult problem in this field.

SUMMARY

The present disclosure provides a media processing method. The method designs the interaction mechanism between a cloud system and a client or a third party and enables the cloud system to collect and upload the media processing solutions provided by the client or the third party.

According to the preceding object, a media processing method according to the present disclosure is implemented. The method includes the following steps: receiving the description information of the media processing and determining whether a function that fulfills the requirement of the description information exists in a system; in a case where the function that fulfills the requirement of the description information exists, selecting the function that fulfills the requirement of the description information from the system; and in a case where the function that fulfills the requirement of the description information does not exist, selecting a function from the system according to priority or selecting a function that fulfills the requirement of the description information from outside the system.

Optionally, the media processing method also includes updating a function stored in the system with the function outside the system.

Optionally, the media processing method also includes feeding back a determination result to the media transmission source so that the transmission source may modify the description information.

Optionally, the descriptor of the function includes at least one of the following descriptors: a frame descriptor, a general descriptor, an input descriptor, an output descriptor, a processing descriptor, a requirement descriptor, a configuration descriptor, a client assistance descriptor, a declaration descriptor, a variable descriptor, an event descriptor, or a security descriptor.

Optionally, the media processing method also includes the following steps: finding possible functions that fulfill the requirement of the description information according to the description information of the media processing; selecting the function that fulfills the requirement of the description information from the possible functions that fulfill the requirement of the description information, where the function includes a configuration parameter; generating a workflow according to the selected function that fulfills the requirement of the description information, where the workflow includes the selected function; creating, based on the workflow, configuration for each task of the media processing and confirming that the configuration of each task is created successfully; and notifying the media transmission source that the media processing is ready to be performed.

According to the preceding object, a media processing system according to the present disclosure is implemented. The system includes a function repository. The function repository is configured to perform the following operations: receiving the description information of the media processing and determining whether the function that fulfills the requirement of the description information exists in the system; in a case where the function that fulfills the requirement of the description information exists, selecting the function that fulfills the requirement of the description information from the system; and in a case where the function that fulfills the requirement of the description information does not exist, selecting the function from the system according to the priority or selecting the function that fulfills the requirement of the description information from outside the system.

Optionally, the media processing system also includes updating the function stored in the system with the function outside the system.

Optionally, the function repository feeds back the determination result to the media transmission source so that the transmission source is able to modify the description information.

Optionally, the descriptor of the function includes at least one of the following descriptors: the frame descriptor, the general descriptor, the input descriptor, the output descriptor, the processing descriptor, the requirement descriptor, the configuration descriptor, the client assistance descriptor, the declaration descriptor, the variable descriptor, the event descriptor, or the security descriptor.

Optionally, the media processing system also includes a manager and a processing entity.

The manager is configured to send, according to the received description information of the media processing, a request to the function repository to find the function that fulfills the requirement of the description information; to select the function that fulfills the requirement of the description information from possible functions that are fed back by the function repository and that fulfill the requirement of the description information, where the function includes a configuration parameter; to generate a workflow according to the selected function that fulfills the requirement of the description information, where the workflow includes the selected function; to create, based on the workflow, configuration for each task of the media processing and send the configuration to the processing entity; and to notify, after the configuration of the each task is created successfully, a media transmission source that the media processing is ready to be performed.

The function repository is configured to find, according to the request to find the function that fulfills the requirement of the description information, the possible functions that fulfill the requirement of the description information and to feed back the possible functions to the manager.

The processing entity is configured to confirm that the configuration of the task is created successfully and feed back information to the manager.

In the solutions of the present disclosure, in view of the shortcomings of the existing art, the cloud system first confirms, according to the requirement of the media processing sent by a media source, whether a function that fulfills the requirement of the media processing exists in the cloud system. By adding a Hook application program interface (API) of a system layer or adding a function repository uploading API, the cloud system can upload a media processing method or media processing function provided by a user or a third party. In this manner, a personalized media processing based on a client or a third party can be implemented.

DETAILED DESCRIPTION

The solution of the present disclosure is further described hereinafter in conjunction with drawings and embodiments. The present disclosure designs the interaction mechanism between the cloud system and the client, and according to the present disclosure, the user's personalized processing methods or personalized processing parameters are collectedthrough a defined API to guide the media processing. The API is designed not only suitable for the user to upload and update a function, but also for any third party to update the function repository.

Embodiment One

Figure 1:
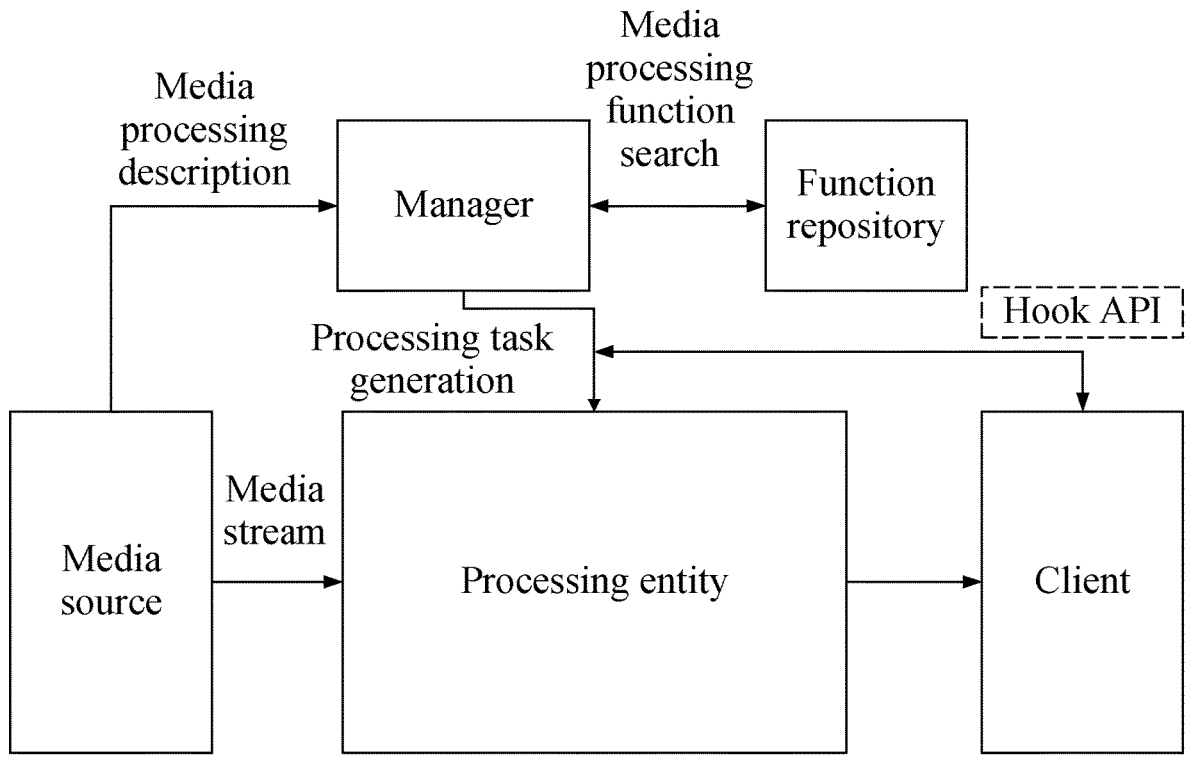
FIG. 1 is a view illustrating the structure of a cloud system that adopts a Hook API solution.

FIG. 1 illustrates a structure of a cloud media processing system (cloud system) according to the present disclosure. Referring to FIG. 1, the cloud system mainly includes a manager, a processing entity and a function repository. A media source (that may be a NBMP source) and a client exist outside the cloud system. Using NBMP as an example, the media processing method of the cloud system is described below.

The NBMP media that needs the media processing and is sent by the NBMP source includes the description information (that is, media processing description) that corresponds to the media processing. The NBMP source uses a function discovery API to check whether the current function repository can provide the function required for the media processing description. The media processing description may be a media type to be processed or the invocation method of a processing function and includes compression, upsampling, video transcoding and other information.

After receiving the media processing description, the function repository determines whether the function that fulfills the requirement of the media processing description exists in the cloud system. In a case where the function that fulfills the requirement of the description information exists, the function that fulfills the requirement of the description information is selected from the system. In a case where the function that fulfills the requirement of the description information does not exist, a function is selected from the function repository according to the priority or a function that fulfills the requirement of the description information is selected from outside the system. If necessary, the function repository may update the function repository in the cloud system with a function outside the cloud system or a function repository outside the cloud system. The function repository feeds back the check result to the NBMP source.

The NBMP source may modify the media processing information according to the check result. The NBMP source sends the media processing information to the manager as part of the request.

According to the received media processing description, the manager sends the request to find the function that fulfills the media processing description to the function repository. The manager sends one query or a group of queries to the function repository to find the function.

For each query, the function repository finds the possible functions that fulfill the requirement of the media processing description and feeds back to the manager with a short list of the possible functions, the description of the possible functions and their configuration information. The descriptor of the function includes at least one of the following descriptors: the frame descriptor, the general descriptor, the input descriptor, the output descriptor, the processing descriptor, the requirement descriptor, the configuration descriptor, the client assistance descriptor, the declaration descriptor, the variable descriptor, the event descriptor, or the security descriptor.

The manager further selects the function that fulfills the requirement of the description information from the possible functions that are fed back by the function repository and fulfill the requirement of the media processing description. The input descriptor of the function includes the configuration parameter. For example, the function of media processing may be a function that corresponds to the media processing method of H.264 video coding, and its main components include function modules such as access unit character separation, additional enhancement information, basic image coding, redundant image coding, timely decoding and refresh, hypothetical reference decoding, and imaginary code stream scheduler.

The manager generates the workflow according to a selected group of functions that fulfill the desired media processing. The workflow includes the selected functions. The configuration is created for each task of the media processing in combination with the workflow and sent to the processing entity.

The processing entity includes an NBMP task module. The NBMP task module confirms that the configuration of the task is created successfully and feeds back the information to the manager.

The manager notifies, after the configuration of each task is created successfully, a media transmission source that the media processing can be started.

The processing entity receives the media stream sent from the media source and sends a media stream subjected to the media processing to the client or other receiving device.

The present disclosure designs the Hook API for each media processing function. When the solution formed by the user or other third party needs to be used for the media processing, the Hook API uploads the media processing function provided by the user or the third party to the cloud system.

The Hook API is a technology used for changing the execution result of the API. When ready-made methods such as controls cannot perform some functions, the API is required. For example, if you are not satisfied with the functions of some API functions, you can modify these APIs to make these APIs provide better services. The original function of the API of a system can be changed by the Hook API. A basic method is to "touch" the entry point of the API function that needs to be modified through the Hook and change its address to point to a new custom media processing function.

There is an API between the manager and the processing entity. This API is called a processing entity API. The user or the third party may hook the processing entity API by Hook API technology. The method of hooking uses the basic principle of the Hook. Each Hook has an associated pointer list. The pointer list is called a hook link list and is maintained by the system. The function entry address of the media processing function in the processing entity API is modified by using the hooking technology of the Hook, that is, the address of the media processing function originally selected by the function repository is replaced with the address of the user or the third party's own media processing function. After the media processing function is run, in the case where the specific parameter value corresponding to each parameter is provided, a media processing parameter may be replaced with the corresponding specific parameter value. Then the replaced parameter value is transmitted to the processing entity by the processing entity API so that the processing entity performs a specific media processing task.

Using a Hook API based on transcoding as an example, during video transcoding, the category of the media processing (here is the video transcoding) needs to be specified, such as the frame rate of the video, the resolution of the video, the quantization step of the video, the encoder of the video, the bit rate of the video, and the sampling rate of the video. These parameters were originally generated through the specific media processing function provided by the function repository and used for guiding task generation. These parameters are defined in the processing entity API, that is, the manager transmits the information defined in the processing entity API to the processing entity, and the processing entity specifically performs the media processing according to the information. The entry function address of the function repository in the processing entity API is replaced with the function address of the user or the third party. After the manager determines the function provided by the user or the third party, the specific media processing task is created by using the address of the media processing function provided by the user or the third party to generate the workflow. The workflow first runs the corresponding media processing function to obtain specific media processing parameter information and then guides the generation of the task.

When the video transcoding adopts the Hook API, the information included in the Hook API is described in Table 1 below.

TABLE 1

| | | Hook API | Transcode |
|---|---|---|---|
| Descriptor | Parameter Name | Type | Value |
| General | Identity | String | Returned by create operation |
| | Name | String | Video transcoding function |
| | Description | String | Video transcoding |
| | Brand | String | Function: transcoding |
| | Input port | Mapping | Mandatory < port 1, stream 1 > |
| | Output port | Mapping | Mandatory < port 1, stream 1 > |
| Input | Media parameter | Object | Mandatory parameter: Media stream number, Bandwidth: maximum value Media type: video Encoder type Encapsulation format Resolution + frame rate Clock frequency Sampling manner Protocol Organizational manner |
| | Metadata parameter | Object | Mandatory parameter: metadata stream number Video encapsulation format or bit rate recommended for a metadata type Protocol Organizational manner |
| Output | Media parameter | Object | Mandatory parameter: media stream number, Bandwidth: maximum value Media type: video Encoder type Encapsulation format Resolution + frame rate Clock frequency Sampling manner Protocol Organizational manner |
| | Metadata parameter | Object | Not required |
| | Disclosed encapsulation format | String | ISOBMFF file |
| Processing | Keyword | Array | Video transcoding |
| | Universal resource identifier | String | Position dependent |

TABLE 1-continued

Hook API_ Transcode

| Descriptor | Parameter Name | Type | Value |
|---|---|---|---|
| Requirement | Quality-of-service requirement | Object | Application dependent |
| | Processing requirement | Object | Input video dependent |
| | Security requirement | Object | Application dependent |
| Configuration | Parameter | Array | Configurated dynamically |
| Client Assistance | Flag | Boole | No |
| | Device performance | String | No |
| | User tendency | String | No |
| Monitoring | Variable | Array | No |
| Declaration | Declaration | Object | No |

The transmission method of the parameters in the preceding Table 1 is not limited to any transmission protocol such as MPEG Media Transport (MMT) and Dynamic Adaptive Streaming over HTTP (DSAH). Transmitted information must include but not be limited to the information described below.
 (1) A general parameter is used for identification and transmission port configuration for the transmission.
 (2) An input and output description parameter is used for describing the media processing type and the specific detail of the media processing which are guided by this parameter, for example, the transcoding parameter in transcoding, such as resolution, frame rate, encoder, encoding manner, and media encapsulation format.
 (3) Other parameters are used for optional requirement information, monitoring information and the like.

Embodiment Two

The difference between embodiment two and embodiment one is the method in which the media processing function provided by the user or the third party is uploaded to the cloud system.

According to the media processing description, the manager determines whether the specific media processing function that may fulfill the requirement in the function repository. In a case where the function that fulfills the requirement of the description information exists, the manager selects the corresponding media processing function from the function repository. In a case where the function that fulfills the requirement of the description information does not exist, the manager may either select the media processing function with the highest priority related to the media processing description from the cloud system, or select the media processing function corresponding to the media processing description from outside user or outside third party and upload the function to the cloud system by the API.

Figure 2:
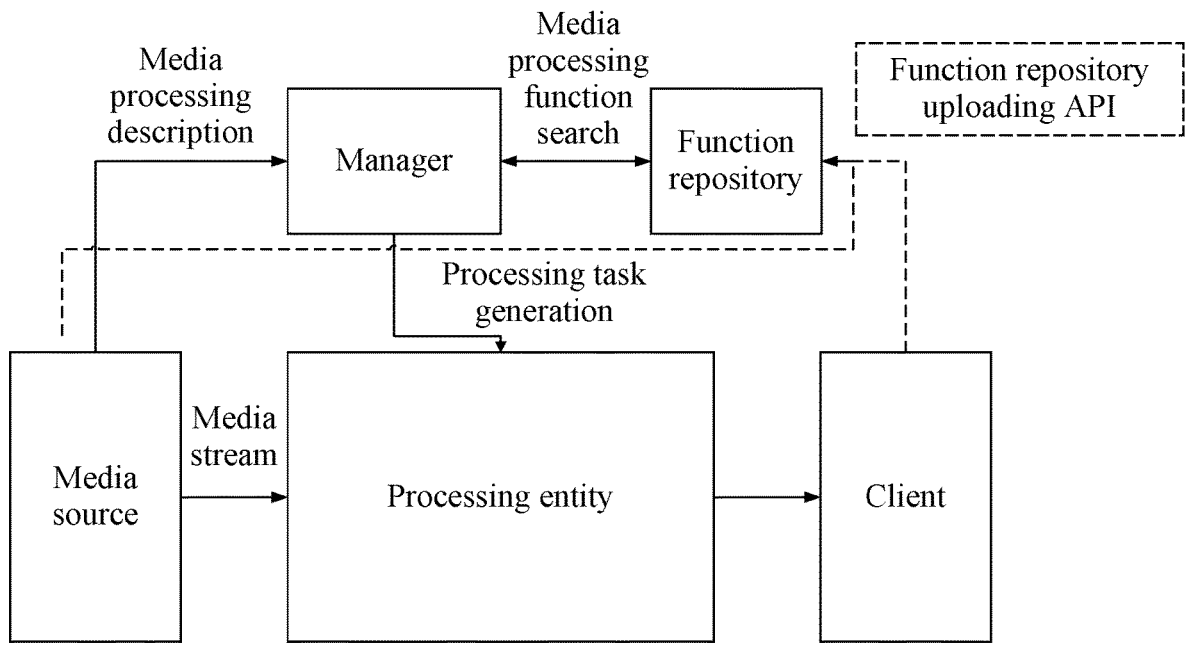
FIG. 2 is a view illustrating the structure of a cloud system that adopts a function repository uploading API solution.

As shown in FIG. 2, the present disclosure adopts a solution of defining function repository uploading API. The function repository uploading API may be used for receiving the specific media processing function transmitted from the client or the third party to the function repository. The manager generates the specific media processing task by these uploaded media processing functions. The processing entity may use the received media processing task to perform the media processing on the received media stream.

The following workflow may also exist for the media processing based on the cloud system: before sending the media processing description to the manager, the media source may send a function query request to the function repository; the existing cloud system may provide corresponding function query API; any corresponding function may be found by a keyword search, for example, any function that may perform video coding, such as H.264 and H.265; if the media source finds that there is no function that fulfills the requirement in the function repository and the media source itself has a corresponding solution or a corresponding function, the function of the media source may be uploaded to the function repository by the function repository uploading API and used in the generation of the subsequent media processing task.

The API should include the identification information and the specific function description information of the user's function. Specifically, the API needs to include the name, the function input description information, the function output description information, and the media processing additional information (for example, encoder requirement) of the upload function.

If the function repository is used for uploading the API, the manager sends a function search request to the function repository. The function repository receives the media processing function from the client or the third party through the function repository uploading API. The specific design of the function repository uploading API is described in Table 2.

TABLE 2

Function Repository Uploading API (Function Repository API)

| Attribute | Description |
|---|---|
| Name | String for function search |
| Function Number | Unique identification flag for each function |
| Uniform Resource Identifier | Position of function dependent |
| Input | Function input parameter |
| Output | Function output parameter |
| Processing | The descriptor provides high-level details about the requested media processing. |
| Requirement | The descriptor provides a requirement that may be configured for a basic resource. |
| Configuration | The descriptor provides configuration information for a basic resource. |
| Client Assistance | The descriptor provides client help information for a basic resource. |
| Monitoring | The descriptor provides monitoring information for a basic resource. |
| Declaration | This descriptor provides the declaration information used for validating a basic resource. |

The interactive information involved in the function repository uploading API should include but not be limited to the information described below: function identification information, function position information, and function input and output information.
 (1) Function identification information: this information is used for the function repository to mark the function provided by the user and is invocated when the manager generates the processing task.
 (2) Function position information: this information is configured to describe the storage position of the function provided by the user.
 (3) Function input and output information: this information describes the input parameter and the output parameter required by the user to provide the function.

The design of the Hook API and the function repository uploading API according to the present disclosure can be extended to any media processing type. For the Hook API, parameter acquisition can be implemented for different media processing types with the arrangement by modifying general information and input and output information. For example, in General:brand:function_name (general description: brand: function name), function_name may be replaced to indicate the object of different media processing. The information may be compression and upsampling. The input and output parameter may be set according to the specific parameter involved in the media processing process. Moreover, only the value byte in Input:value needs to be replaced, and the rest is processed similarly. The function repository uploading API is similar to the case of the Hook API. The uploading and use of the functions of different user or different third party may be performed with the arrangement in which the corresponding byte is replaced.

In the solution of the media processing provided by the present disclosure, the cloud system first confirms, according to the requirement of the media processing sent by the media source, whether the function that fulfills the requirement of the media processing exists in the cloud system. With the arrangement in which the Hook API of the system layer and the function repository uploading API are added to the existing cloud system, the personalized media processing based on the client or the third party can be implemented. Therefore, the user consumption experience and the integrity and the robustness of the system can be improved.

What is claimed is:

1. A media processing method, comprising:
receiving description information of media processing and determining whether a function that fulfills a need of the description information exists in a cloud media processing system, wherein the description information of media processing is description information corresponding to the media processing;
in a case where the function that fulfills the need of the description information exists, selecting the function that fulfills the need of the description information from the cloud media processing system; and
in a case where the function that fulfills the need of the description information does not exist, selecting a function from the cloud media processing system according to priority for a function or selecting the function that fulfills the need of the description information from a client or third party outside the cloud media processing system,
wherein the media processing method further comprises:
finding, according to the description information of the media processing, possible functions that fulfill the need of the description information;
selecting the function that fulfills the need of the description information from the possible functions that fulfill the need of the description information, wherein the function comprises a configuration parameter;
generating a workflow according to the selected function that fulfills the need of the description information, wherein the workflow comprises the selected function;
creating, based on the workflow, configuration for each task of the media processing and confirming that the configuration of each task is created successfully; and
notifying a media transmission source that the media processing is ready to be performed.

2. The media processing method according to claim 1, after selecting the function that fulfills the need of the description information from a client or a third party outside the cloud media processing system, further comprising:
updating a function stored in the cloud media processing system with the function outside the cloud media processing system.

3. The media processing method according to claim 1, further comprising:
feeding back a determination result to a media transmission source so that the transmission source is able to modify the description information.

4. The media processing method according to claim 1, wherein
a descriptor of the function comprises at least one of the following: a frame descriptor, a general descriptor, an input descriptor, an output descriptor, a processing descriptor, a requirement descriptor, a configuration descriptor, a client assistance descriptor, a declaration descriptor, a variable descriptor, an event descriptor, or a security descriptor.

5. A media processing system comprising a function repository, a manager and a processing entity, wherein the function repository is configured to perform the following operations:
receiving description information of media processing and determining whether a function that fulfills a need of the description information exists in the cloud media processing system, wherein the description information of media processing is description information corresponding to the media processing;
in a case where the function that fulfills the need of the description information exists, selecting the function that fulfills the need of the description information from the cloud media processing system; and
in a case where the function that fulfills the need of the description information does not exist, selecting a function from the cloud media processing system according to priority or selecting the function that fulfills the need of the description information from outside the cloud media processing system,
wherein the manager is configured to send, according to the received description information of the media processing, a request to the function repository to find the function that fulfills the need of the description information; to select the function that fulfills the need of the description information from possible functions that are fed back by the function repository and that fulfill the need of the description information, wherein the function comprises a configuration parameter; to generate a workflow according to the selected function that fulfills the need of the description information, wherein the workflow comprises the selected function; to create, based on the workflow, configuration for each task of the media processing and send the configuration to the processing entity; and to notify, after the configuration of each task is created successfully, a media transmission source that the media processing is ready to be performed,
wherein the function repository is configured to find, according to the request to find the function that fulfills the need of the description information, the possible functions that fulfill the need of the description information and to feed back the possible functions to the manager, and
wherein the processing entity is configured to confirm that the configuration of the task is created successfully and feed back information to the manager.

6. The media processing system according to claim 5, after selecting the function that fulfills the need of the description information from a client or a third party outside the cloud media processing system, further comprising:
  updating a function stored in the cloud media processing system with the function outside the cloud media processing system.

7. The media processing system according to claim 5, wherein
  the function repository is further configured to feed back a determination result to a media transmission source so that the transmission source is able to modify the description information.

8. The media processing system according to claim 5, wherein
  a descriptor of the function comprises at least one of the following descriptors: a frame descriptor, a general descriptor, an input descriptor, an output descriptor, a processing descriptor, a requirement descriptor, a configuration descriptor, a client assistance descriptor, a declaration descriptor, a variable descriptor, an event descriptor, or a security descriptor.

\* \* \* \* \*